US012686292B2

(12) United States Patent
Nakamura et al.

(10) Patent No.: US 12,686,292 B2
(45) Date of Patent: Jul. 21, 2026

(54) SERVER, CHARGING SYSTEM AND CHARGING METHOD

(71) Applicant: TOYOTA JIDOSHA KABUSHIKI KAISHA, Toyota (JP)

(72) Inventors: Fumihiko Nakamura, Susono (JP); Yoshihiro Sakayanagi, Mishima (JP); Masato Ehara, Gotemba (JP); Koichi Ueda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 576 days.

(21) Appl. No.: 18/366,063

(22) Filed: Aug. 7, 2023

(65) Prior Publication Data

US 2024/0092215 A1 Mar. 21, 2024

(30) Foreign Application Priority Data

Sep. 16, 2022 (JP) ................................. 2022-148179

(51) Int. Cl.
*B60L 53/66* (2019.01)
*B60L 53/62* (2019.01)

(52) U.S. Cl.
CPC ............. *B60L 53/665* (2019.02); *B60L 53/62* (2019.02)

(58) Field of Classification Search
CPC ................................ B60L 53/665; B60L 53/62
USPC ........................................................ 320/109
See application file for complete search history.

(56) References Cited

U.S. PATENT DOCUMENTS

| | | | | |
|---|---|---|---|---|
| 2016/0375783 A1* | 12/2016 | Uyeki | ................... | B60L 53/305 320/137 |
| 2019/0118667 A1* | 4/2019 | Sakuma | ................ | H04W 12/06 |
| 2023/0108551 A1* | 4/2023 | Miyake | ................ | H04L 9/0872 713/168 |
| 2023/0153794 A1* | 5/2023 | Gerban | .............. | G06Q 20/4014 705/65 |
| 2023/0297988 A1* | 9/2023 | Kobayashi | ........... | G06Q 20/201 705/20 |
| 2025/0005553 A1* | 1/2025 | Hasegawa | ............. | G07F 13/025 |

FOREIGN PATENT DOCUMENTS

| | | |
|---|---|---|
| CN | 113954681 A | 1/2022 |
| JP | 2017-027207 A | 2/2017 |
| KR | 10-2010-0019803 A | 2/2010 |

* cited by examiner

*Primary Examiner* — Ahshik Kim
(74) *Attorney, Agent, or Firm* — Oliff PLC

(57) ABSTRACT

A server comprising a processor. Further, the processor acquires credit card information and a one-time password from a vehicle connected to a charging device through a secure first communication path; acquires the one-time password from the vehicle through the charging device and a non-secure second communication path which is different from the first communication path; and charges an amount of money corresponding to an amount of power supplied by the charging device to the vehicle based on the credit card information when the one-time password acquired through the first communication path matches the one-time password acquired through the second communication path.

4 Claims, 3 Drawing Sheets

SERVER, CHARGING SYSTEM AND CHARGING METHOD

CROSS-REFERENCE TO RELATED APPLICATION(S)

The present application claims priority to and incorporates by reference the entire contents of Japanese Patent Application No. 2022-148179 filed in Japan on Sep. 16, 2022.

BACKGROUND

The present disclosure relates to a server, a charging system and a charging method.

The Japanese Laid-open Patent Publication No. 2017-027207 describes that the authentication server which generates a one-time password corresponding to the user and transmits the one-time password to the first communication terminal device of the user. The second communication terminal device, which is different from the first communication terminal device, accepts an input of a one-time password received by the first communication terminal device based on an operation by a user, and transmits the one-time password to the authentication server. After that, Japanese Laid-open Patent Publication No. 2017-027207 further describes a technology that the authentication server performs user authentication on the user of the first communication terminal device based on the one-time password received from the second communication terminal.

SUMMARY

There is a need for providing a server, a charging system, and a charging method which can enhance user convenience.

According to an embodiment, a server includes a processor. Further, the processor acquires credit card information and a one-time password from a vehicle connected to a charging device through a secure first communication path; acquires the one-time password from the vehicle through the charging device and a non-secure second communication path which is different from the first communication path; and charges an amount of money corresponding to an amount of power supplied by the charging device to the vehicle based on the credit card information when the one-time password acquired through the first communication path matches the one-time password acquired through the second communication path. According to an embodiment, a charging system includes a charging device, a vehicle including a first processor, and a server including a second processor. Further, the first processor generates a one-time password when the vehicle is connected to the charging device, transmits credit card information and the one-time password to the server through a secure first communication path, and transmits the one-time password through the charging device and a non-secure second communication path which is different from the first communication path, and the second processor acquires the credit card information and the one-time password from the vehicle through the first communication path, acquires the one-time password from the vehicle through the second communication path, and charges an amount of money corresponding to an amount of power supplied by the charging device to the vehicle based on the credit card information when the one-time password acquired through the first communication path matches the one-time password acquired through the second communication path.

According to an embodiment, a charging method performed by a charging system, the charging system including a charging device, a vehicle having a first processor, and a server having a second processor, the charging method including: generating, by the first processor, a one-time password when the vehicle is connected to the charging device, transmitting, by the first processor, credit card information and the one-time password through a secure first communication path, transmitting, by the first processor, the one-time password through the charging device and a non-secure second communication path which is different from the first communication path, and charging, by the second processor, an amount of money corresponding to an amount of power supplied by the charging device to the vehicle based on the credit card information when the one-time password acquired through the first communication path matches the one-time password acquired through the second communication path.

DETAILED DESCRIPTION

Figure 1:
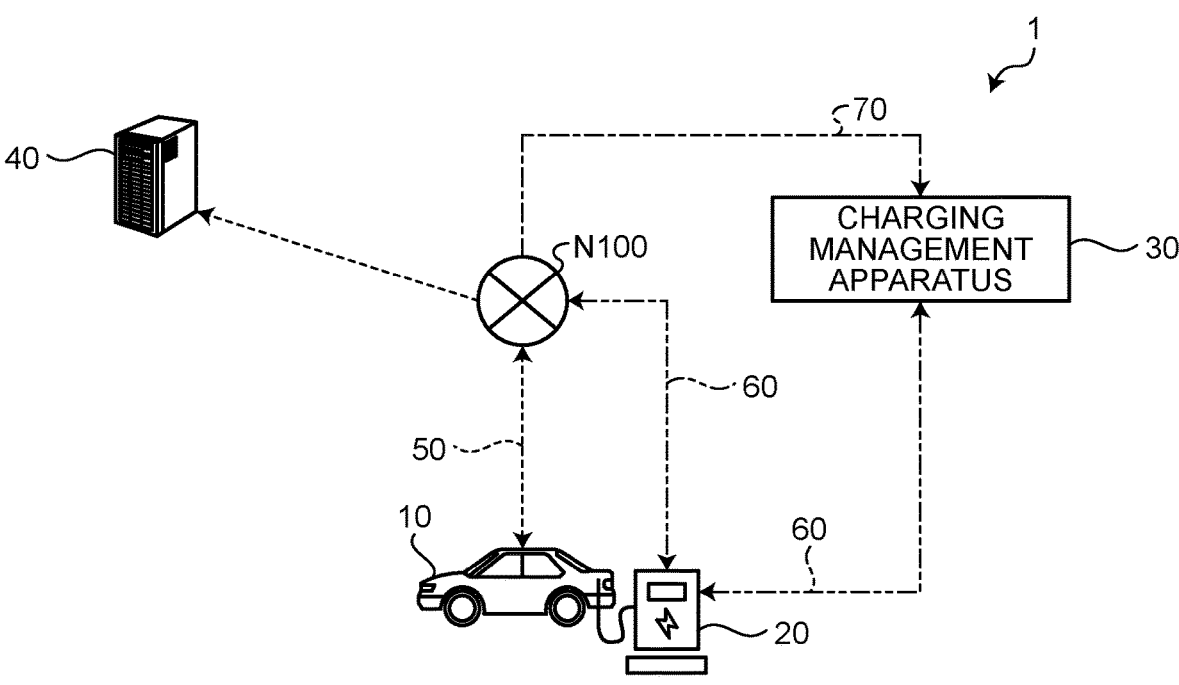
FIG. 1 is a diagram illustrating a schematic configuration of a billing system according to an embodiment.

In Japanese Laid-open Patent Publication No. 2017-027207, there is room for improvement in convenience because operation and intervention of a person using the first communication terminal device and the second communication terminal device of the user are required. Hereinafter, a billing system according to an embodiment of the present disclosure will be described with reference to the drawings. Note that the present disclosure is not limited by the following embodiments. In the following, the same elements will be described with the same reference numerals.

Configuration of Charging System

Figure 2:
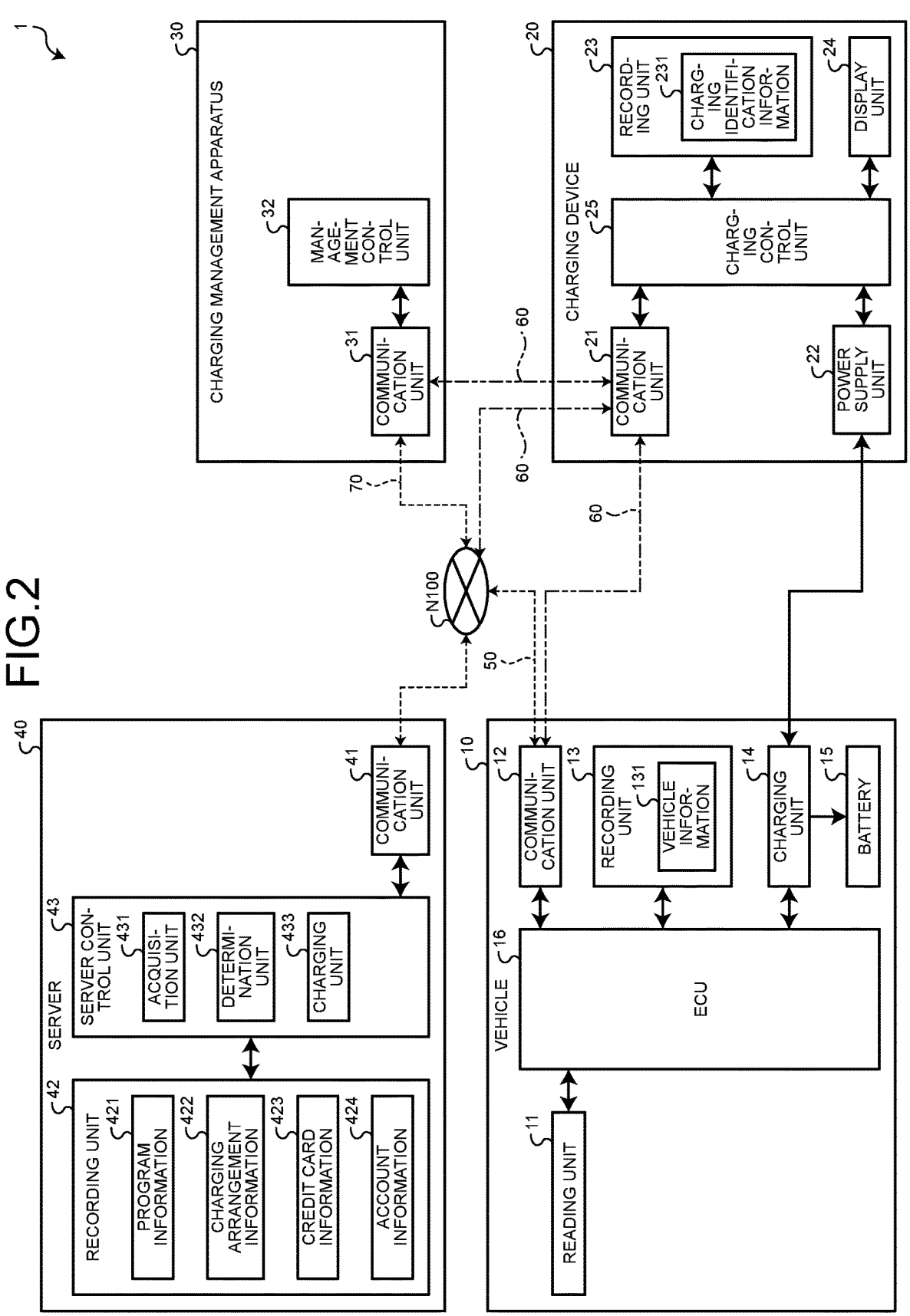
FIG. 2 is a block diagram illustrating a functional configuration of a billing system according to an embodiment.

FIG. 1 is a diagram illustrating a schematic configuration of a charging system according to an embodiment. FIG. 2 is a block diagram illustrating a functional configuration of a billing system according to an embodiment. The charging system 1 illustrated in FIGS. 1 and 2 includes a vehicle 10, a charging device 20, a charging management apparatus 30, and a server 40. The charging system 1 is communicatively connected to each of the vehicles 10, the charging management apparatus 30, and the server 40 through a networked N100. The network N100 is composed of, for example, an Internet line network, a cellular telephone line network, and the like.

Further, in one embodiment, the first communication path 50 connecting the vehicle 10 and server 40 via a networked N100 forms a secure communication path. Further, in one embodiment, the second communication path 60 for connecting the charging device 20 and the charging management apparatus 30 forms a non-secure communication path different from the first communication path 50. Specifically, the standard of the second communication path 60 is, for example, ECHONETLite (registered trademark) standard. Furthermore, in one embodiment, the third communication path 70 connecting the charging management apparatus 30 and the server 40 via the networked N100 forms a secure communication path. Here, the standard of the third communication path 70 is, for example, Open Charge Point Protocol (OCPP) standard.

Configuration of the Vehicle

Next, a configuration of the vehicle 10 is described. The vehicle 10 is assumed to be a Battery Electric Vehicle (BEV) and a Plug-in Hybrid Electric Vehicle (PHEV). The vehicle 10 includes a reading unit 11, a communication unit 12, a recording unit 13, a charging unit 14, a battery 15, and an Electronic Control Unit (ECU) 16.

The reading unit 11 reads the credit card information stored in the credit card inserted from the outside, and outputs the read credit card information to ECU 16. Here, the credit card information includes a credit card number as a user identification number, the name of the credit card holder, the expiration date of the credit card and the security code, and the like. The reading unit 11 is implemented using a card reader or the like.

Under the control of ECU 16, the communications unit 12, transmits various information to the server 40 through the first communication path 50, receives various information from the server 40 through the first communication path 50. Specifically, the communication unit 12 transmits the credit card information and the one-time password inputted from ECU 16 to the server 40 through the first communication path 50 when the vehicle 10 is connected to the charging device 20. The communication unit 12 is realized by using a communication module or the like capable of transmitting and receiving various information.

The recording unit 13 records the vehicle information 131 identifying the vehicle 10 and various information related to the vehicle 10. The vehicle information 131 includes a vehicle type of the vehicle 10, a serial number and a year of the vehicle 10, and the like. The recording unit 13 is realized using a Read Only Memory (ROM), a Random Access Memory (RAM), a Solid State Drive (SSD), and a Hard Disk Drive (HDD).

The charging unit 14 is electrically connected to the power supply unit 22 of the charging device 20. The charging unit 14, under the control of ECU 16, converts the power supplied from the charging device 20 into a predetermined voltage and outputs the battery 15. The charging unit 14 is realized by using a charging inlet or the like.

Under the control of ECU 16, the battery 15 stores the power supplied from the charging device 20 through the charging unit 14 and supplies power to a drive source such as a motor (not shown). The battery 15 is implemented using a lithium ion battery or the like.

The ECU 16 is implemented by using a hardware-based processor. The hard disks are, for example, memories and a Central Processing Unit (CPU). The ECU 16 controls each part constituting the vehicles 10. The ECU 16 generates a one-time password when the vehicle 10 is connected to the charging device 20. The ECU 16 transmits the credit card information input from the one-time password and the reading unit 11 to the server 40 through the communication unit 12 and the first communication path 50. The ECU 16 also transmits a one-time password generated when the vehicle 10 is connected to the charging device 20 to the servers 40 through the charging device 20 and the second communication path 60. In one embodiment, the ECU 16 functions as a first processor.

Configuration of Charging Device

Next, the configuration of the charging device 20 will be described. The charging device 20 supplies power to the vehicle 10. The charging device 20 includes a communication unit 21, a power supply unit 22, a recording unit 23, and a display unit 24.

The communication unit 21 transmits the one-time password, the charging identification information, and the power supply amount to the server 40 under the control of the charging control unit 25. The one-time password is input from the vehicle 10 via the second communication path 60. In addition, the charge identification information includes location information, an identification ID, a power supply system, and the like. The placement location information relates to the placement location of the charging device 20. Further, the identification ID is for identifying the charging device 20. Furthermore, the feeding amount is the power supplied from the charging device 20 to the vehicle 10. The communication unit 21 is realized by using a communication module or the like capable of transmitting and receiving various information.

When the vehicle 10 is electrically connected thereto, under the control of the charging control unit 25, the power supply unit 22 converts the power from the external power source into a predetermined voltage to supply power to the vehicle 10. The power supply unit 22 is realized using an inlet or the like.

The recording unit 23 records the charging identification information 231 related to the charging device 20. The recording unit 23 is implemented using a ROM, a RAM, an SSD or a HDD.

The display unit 24 displays various information related to the charging device 20 under the control of the charging control unit 25. The display unit 24 is implemented using an Organic Electroluminescent Display (organic EL display) or a liquid crystal display or the like.

The charge control unit 25 is implemented by using a processor having hardware. The hardware-such as memories and a CPU. The charging control unit 25 controls the respective units constituting the charging device 20.

Configuration of Charge Management Device

Next, the configuration of the charging management apparatus 30 will be described.

For simplicity of description, In FIG. 1 and FIG. 2, a case of the charging management is described where only one charging device 20 is arranged. Note that, however, the same charging management can be performed even a plurality of the charging devices 20 is arranged. The charging management apparatus 30 includes a communication unit 31, and a management control unit 32.

Under the control of the management control unit 32, the communication unit 31 transmits various information for managing the charging device 20 and receives various information from the charging device 20 and transmits the information to the server 40. The communication unit 31 is realized by using a communication module or the like capable of transmitting and receiving various information. The management control unit 32 is implemented by using a processor having hardware such as a memory and a CPU. The management control unit 32 controls the respective units constituting the charging management apparatus 30. The management control unit 32 controls the power supply performed by the charging device 20.

Server Configuration

Next, the configuration of the server 40 will be described. The server 40 is a server for managing the account and credit card of the user. The server 40 is provided in a financial institution or a credit card company. Here, the financial institutions include, for example, banks, credit banks, credit unions, and labor banks. The server 40 includes a communication unit 41, a recording unit 42, and a server control unit 43.

The communication unit 41 receives the one-time password and the credit information transmitted from the vehicle 10 through the first communication path 50 and outputs the one-time password and the credit information to the server control unit 43 under the control of the server control unit 43. The communication unit 41 receives the one-time password transmitted from the vehicle 10 through the second communication path 60 and the charging device 20 and outputs it to the server control unit 43. The communication unit 41 is realized by using a communication module or the like capable of transmitting and receiving various information.

The recording unit 42 stores the program information 421, the charging arrangement information 422, the account information 424, and the credit card information 423. The program information 421 includes, for example, various programs executed by the server 40. The charging arrangement information 422 includes, for example, a position where the charging device 20 is disposed, the charging identification information for identifying the charging device 20 and the power supply system of the charging device, 20 and the like. The credit card information 423 includes, for example, the name of the user, the credit card number, the expiration date of the credit card, the security code, the usage limit amount, the card usage history, and the like.

The server control unit 43 is configured by using a processor having hardware such as a memory and a CPU. The server control unit 43 controls each unit constituting the server 40. The server control unit 43 includes an acquisition unit 431, a determination unit 432, and a charging unit 433. In one embodiment, the server control unit 43 functions as the second processor.

The acquiring unit 431 acquires the credit information and the one-time password from the vehicle 10 connected to the charging device 20 through the secure first communication path 50 and the communication unit 41.

Furthermore, the acquiring unit 431 acquires the one-time password from the vehicle 10 through the non-secure second communication path 60, the charging device 20, and the communication unit 41.

The determination unit 432 determines whether the one-time password acquired from the vehicle 10 through the secure first communication path 50 matches (i.e., is the same as) the one-time password acquired through the non-secure second communication path 60 and the charging device 20.

The charging unit 433 charges the amount of money corresponding to the amount of power supplied from the charging device 20 to the vehicle 10 based on the credit information. Specifically, when it is determined that the two one-time passwords match each other by the determination unit 432, the charging unit 433 charges the amount of money corresponding to the amount of power supplied from the charging device 20 to the vehicle 10 based on the credit information.

Treatment of Charging System

Figure 3:
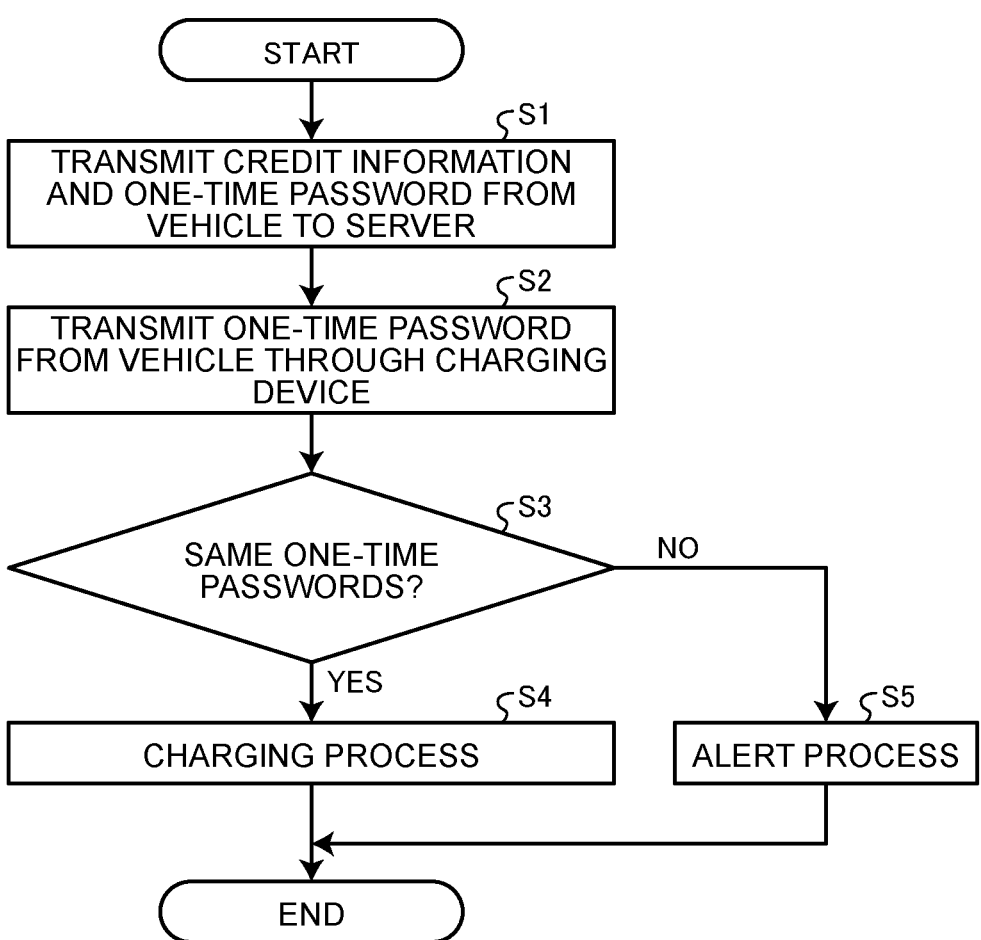
FIG. 3 is a flowchart illustrating an outline of processing that is executed by the billing system according to an embodiment.

FIG. 3 is a flowchart illustrating an outline of a process executed by the charging system 1. As illustrated in FIG. 3, the ECU 16 transmits the credit information and the one-time password from the vehicle 10 to the server 40 through the first communication path 50 (in step S1). In this instance, the ECU 16 generates a one-time password when the vehicle 10 is connected to the charging device 20.

Subsequently, the ECU 16 transmits the one-time password from the vehicle 10 to the server 40 through the second communication path 60 and the charging device 20 (in step S2). In this case, the charging device 20 or the charging management apparatus 30 transmits the amount of power supplied by the charging device 20 to the vehicle 10 via the second communication path 60 or the third communication path 70 to the server 40.

Thereafter, the determination unit 432 determines whether the one-time password acquired by the acquisition unit 431 through the first communication path 50 matches the one-time password acquired by the acquisition unit 431 through the communication unit 41, the second communication path 60, and the charging device 20 (in step S3). If the determination unit 432 determines that the two one-time passwords coincide (YES in step S3), the billing system 1 proceeds to the step S4. In contrast, when the determination unit 432 determines that the two one-time passwords do not match (NO in step S3), the billing system 1 proceeds to step S5.

In Step S4, the charging unit 433 performs a charging process of charging the amount of power according to the amount of power supplied by the charging device 20 to the vehicle 10 based on the credit data (Step S4). Specifically, the charging unit 433 refers to the credit card information and the account information recorded by the recording unit 42, and charges the amount of money corresponding to the amount of power supplied by the charging device 20 supplying power to the vehicle 10 from the account of the user corresponding to the credit card number of the credit information. Thus, the user can perform the power supply of the vehicle only by connecting the vehicle 10 to the charging device 20 without performing a complicated operation. After step S4, the charging system 1 terminates this process.

In step S5, the charging unit 433 executes an alert process indicating that the two one-time passwords do not match. Specifically, the charging unit 433 instructs the charging device 20 to warn that the two one-time passwords do not match toward the charging device 20 and thus it is impossible to supply power from the charging device 20 to the vehicle 10. In this case, the charging control unit 25 displays a warning to the effect that the power cannot be supplied toward the vehicle 10 connected to the charging device 20 on the display unit 24. Furthermore, the charging control unit 25 stops the power supply to the vehicle 10 connected to the charging device 20. Thus, the user can understand that it is impossible to supply power to the vehicle 10 by the charging device 20.

According to the embodiment described above, the acquiring unit 431 acquires the credit card information and the one-time password from the vehicle 10 connected to the charging device 20 through the secure first communication path 50. Then, the acquiring unit 431 acquires the one-time password from the vehicle 10 through the charging device 20 and the non-secure second communication path 60 different from the first communication path 50. Thereafter, the determination unit 432 determines whether the one-time password from the vehicle 10 acquired via the first communication path 50 matches the one-time password from the vehicle 10 acquired via the second communication path 60. Subsequently, when it is determined that the two one-time passwords match each other by the determination unit 432, the charging unit 433 charges the amount of money corresponding to the supply amount in which the charging device 20 supplies power to the vehicle 10 based on the credit card information. As a result, the user can only connect the vehicle 10 to the charging device 20 without performing a complicated operation such as an input operation of a one-time password using a communication terminal or the like, it is possible to power the vehicle.

In addition, according to one embodiment, the ECU 16 generates a one-time password when the vehicle 10 is connected to the charging device 20 and transmits the one-time password to the servers 40 via each of the first communication path 50 and the second communication path 60. Thus, while ensuring security, without performing complicated operations such as input operation of one-time password, the user simply connects the vehicle 10 to the charging device 20 to supply a power the vehicle.

In the description of the flowchart in the present specification, it has been clarified the relationship before and after the processing between the steps using expressions such as "first", "thereafter" "subsequently" etc., the order of the processing necessary for carrying out the present embodiment is not uniquely defined by their expressions. That is, the order of processing in the flowcharts described herein may be varied to the extent that there is no discrepancy.

Further effects and variations can be readily derived by one skilled in the art. The broader aspects of the invention are not limited to the specific details and representative embodiments expressed and described above. Accordingly, various changes may be made without departing from the spirit or scope of the overall inventive concept defined by the appended claims and their equivalents. While some of the embodiments of the present application have been described in detail based on the drawings, these are illustrative, and it is possible to implement the present invention in other forms which are variously modified and improved based on the knowledge of those skilled in the art, starting from the aspects described in the column of the disclosure of the present invention.

According to the present disclosure, it is possible to enhance the convenience of the user.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising a processor, wherein the processor is configured to acquire credit card information and a one-time password from a vehicle connected to a charging device through a secure first communication path;

acquire the one-time password from the vehicle through the charging device and a non-secure second communication path which is different from the first communication path; and charge an amount of money corresponding to an amount of power supplied by the charging device to the vehicle based on the credit card information when the one-time password acquired through the first communication path matches the one-time password acquired through the second communication path.

2. The server according to claim 1, wherein the one-time password is generated by the vehicle when the vehicle is connected to the charging device.

3. A charging system comprising a charging device, a vehicle including a first processor, and a server including a second processor, wherein the first processor is configured to generate a one-time password when the vehicle is connected to the charging device, transmit credit card information and the one-time password to the server through a secure first communication path, and transmit the one-time password through the charging device and a non-secure second communication path which is different from the first communication path, and the second processor is configured to acquire the credit card information and the one-time password from the vehicle through the first communication path, acquire the one-time password from the vehicle through the second communication path, and charge an amount of money corresponding to an amount of power supplied by the charging device to the vehicle based on the credit card information when the one-time password acquired through the first communication path matches the one-time password acquired through the second communication path.

4. A charging method performed by a charging system, the charging system including a charging device, a vehicle having a first processor, and a server having a second processor, the charging method comprising:

generating, by the first processor, a one-time password when the vehicle is connected to the charging device, transmitting, by the first processor, credit card information and the one-time password through a secure first communication path, transmitting, by the first processor, the one-time password through the charging device and a non-secure second communication path which is different from the first communication path, and charging, by the second processor, an amount of money corresponding to an amount of power supplied by the charging device to the vehicle based on the credit card information when the one-time password acquired through the first communication path matches the one-time password acquired through the second communication path.

* * * * *